Nov. 27, 1945.  H. T. STOWELL  2,389,698

AIR CONDITIONING

Filed Dec. 30, 1941

Inventor:
Harold T. Stowell
Pierce & Scheffler
Attorneys

Patented Nov. 27, 1945

2,389,698

UNITED STATES PATENT OFFICE 2,389,698

AIR CONDITIONING

Harold T. Stowell, Washington, D. C., assignor to Research Corporation, New York, N. Y., a corporation of New York Application December 30, 1941, Serial No. 425,003

4 Claims. (Cl. 21—74)

This invention relates to the conditioning of air and is particularly directed to a method and apparatus for reducing the harmful effect of pollen and other organic particles in the air.

It is known that many people are hypersensitive to pollen grains suspended in the air and it is believed that the protein content of the pollen is particularly responsibe for the allergic reactions known as hay fever. Investigations have shown that the harmful effects upon hypersensitive people of air containing pollen grains may be substantially decreased by heating the air.

However, heating air passing to a living or working space is frequently undesirable and inconsistent with the maintaining of optimum comfort conditions. Moreover, in view of the enormously greater heat capacity of the air than that of the pollen grains or other organic particles which may be present therein, only a very small portion of the heat energy supplied to the air will be directly utilized in heating the pollen grains and most of the heat supplied will be absorbed in raising the temperature of the air, frequently with detriment to desirable comfort conditions.

A principal object of the present invention is to provide a method and apparatus for denaturing organic proteinous particles in the air with a minimum energy expenditure and with a minimum change in the temperature of the air, by subjecting the air to treatment with radiant energy to which the air itself is substantially transparent but which is largely absorbed by the suspended organic particles. If a gaseous atmosphere containing suspended solid or liquid particles is irradiated with radiation having a range of wave-lengths to which the gaseous atmosphere is transparent and for which the particles have a high coefficient of absorption, it is possible to raise the effective temperature of the suspended particles substantially above the temperature of the ambient atmosphere and if the relative mass of the suspended particles is small compared to the mass of the atmosphere the equilibrium temperature of the system after such a treatment need not be substantially different from the original temperature.

The invention is therefore characterized by the principle that air containing suspended proteinous particles is irradiated with radiant energy of wave-lengths for which the particles have a substantially greater absorption capacity than has air while reducing the conductive and convective heating of the air to a minimum. This can be effectively accomplished by passing the air to be supplied to a conditioned space through a zone irradiated by radiant energy having wave-lengths preponderantly in the near infra-red. Pollen grains and other proteinous particles in the atmosphere in the natural state contain relatively large proportions of water, both absorbed and constitutionally combined, and therefore the use of radiation for which water has a high coefficient of absorption is particularly desirable. Such radiation may be effectively provided by the use of carbon filament electric lamps which emit a preponderance of radiation in the near infra-red, particularly in the range from 10,000 A. to 16,000 A. Radiation sources providing heat energy of somewhat longer wave-lengths up to 100,000 A. may also be used but with a somewhat lower efficiency due to the greater absorption of the longer wave-lengths by the air and particularly by the walls of the radiating zone, which thereupon heat the air in contact therewith by convection and conduction.

Reduction of conductive and convective heat transfer to the air may be advantageously provided by lining the radiation zone with a material having a high reflection capacity for radiant energy in the near infra-red, such as gold, copper, silver, aluminum and nickel.

If the air is to be subjected to other conditioning operations before it is supplied to the conditioned space, it is desirable that these operations, particularly humidification and dehumidification operations, be carried out before the air is subjected to the radiant energy treatment of the present invention. The treatment of the present invention may be used in cooperation with any of the conventional conditioning operations, such as filtration, scrubbing, heating, cooling, humidifying or dehumidifying, but, in general, it should be separate from and subsequent to any other conditioning treatment, although it may effectively and conveniently be combined with a heating treatment. For example, air may be subjected to dehumidification by chilling it by direct or indirect contact with refrigerated brine to a temperature such that upon reheating to a temperature of say 70° F. it will have a relative humidity of approximately 40%. The chilled air may then be simultaneously heated to about 70° F. and subjected to infra-red radiation to denature the pollen content or other proteinous suspended matter therein. Or the air may have its temperature and humidity brought to comfort conditions by direct contact with a hygroscopic liquid maintained at predetermined concentration and temperature and the air thereafter subjected to treatment with infra-red radiation without substantial change in its temperature.

The invention will be more particularly described with reference to the accompanying drawing showing illustrative embodiments of the invention.

Figure 1:
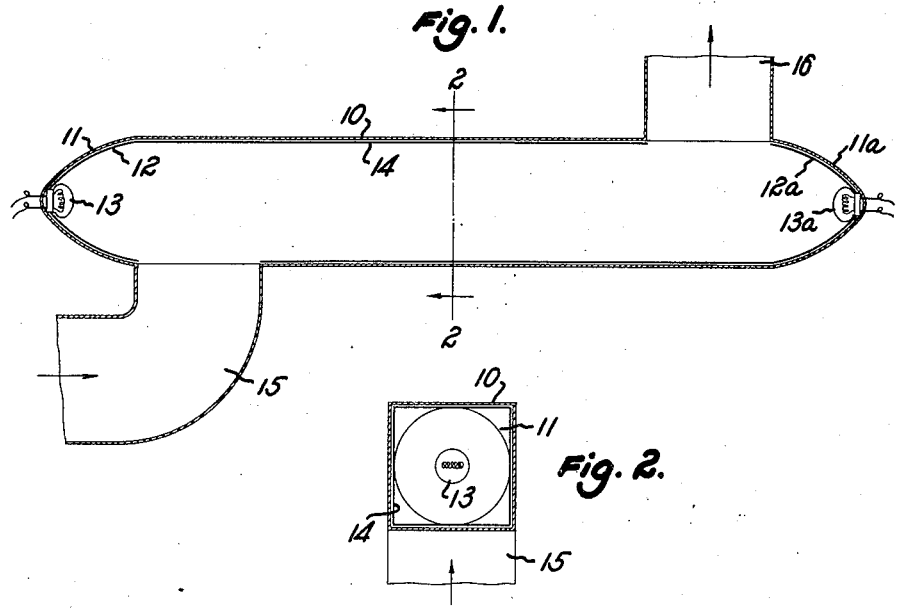
Fig. 1 is a partly diagrammatic longitudinal section of apparatus embodying the principles of the invention.
Figure 2:
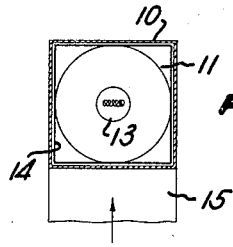
Fig. 2 is a section on line 2—2 of Fig. 1.

In Figs. 1 and 2, 10 is an air conduit having at its ends the reflector housings 11 and 11*a* provided with parabolic reflectors 12 and 12*a*. Sources of infra-red radiations such as 250-watt carbon filament electric lamps 13 and 13*a* are mounted with the filaments at the foci of the reflectors. The conduit is lined with a reflecting material 14. The reflectors 12, 12*a* and the reflecting material 14 are made of, or plated with, one of the metals referred to above, such as copper.

Air entering the apparatus at 15 from the outside atmosphere, from the conditioned space, or from a previous conditioning operation, such as filtration or dehumidification, is passed through the conduit 10 wherein it is subjected to intense infra-red radiation from the lamps and reflected from the reflecting surfaces, and the proteinous suspended particles are thereby dehydrated and denatured. Leaving the treatment zone at 16, the air may be passed directly to the space to be conditioned.

Figure 3:
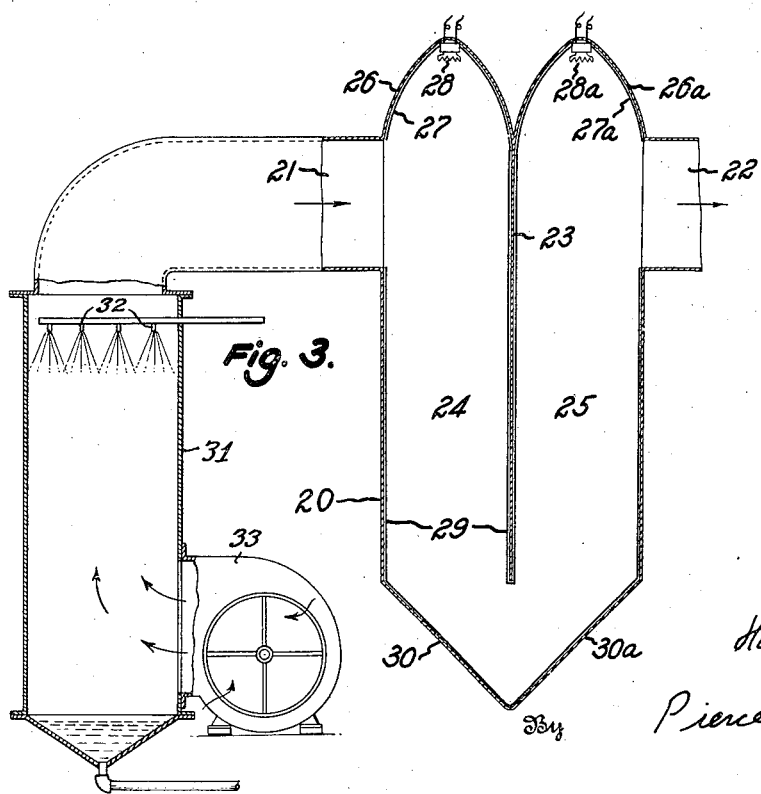
Fig. 3 is a longitudinal section of a modified form of apparatus.

In the apparatus of Fig. 3, 20 is a casing for the treatment zone having an air inlet 21 and outlet 22. The casing is divided by partition 23 into a pair of passages 24, 25 communicating at the bottom of the casing. At the upper end of each of passages 24, 25 is a reflector housing 26, 26*a* provided with a parabolic reflector 27, 27*a* and enclosing a source of infra-red radiation 28, 28*a* positioned at the focus of the reflectors. The passages are lined with highly reflecting metallic material 29. The lower end of the passages are preferably formed of members 30, 30*a* positioned to reflect incident radiation at successive 90° angles, so that radiation from lamps 28, 28*a* tends to pass the full length of the passages 24, 25 except as absorbed by the suspended particles in the air stream.

The air before passing into the treatment zone may be advantageously adjusted to a predetermined humidity, for example, by contacting with refrigerated brine in dehumidifier 31. The brine is sprayed into the air through sprayheads 32. The air is blown through the dehumidifier and treater by blower 33.

I claim:

1. Apparatus for the conditioning of air to be supplied to a conditioned space comprising a conduit, means for passing air through said conduit, a reflective lining in said conduit having a metallic surface having a high coefficient of reflection for near visible infra-red radiation, and a source of infra-red radiation positioned to radiate into said conduit.

2. Apparatus for the conditioning of air to be supplied to a conditioned space comprising an elongated conduit, means for passing air through said conduit, a reflective metallic-surfaced lining in said conduit having a high coefficient of reflection for near visible infra-red radiation and a source of infra-red radiation positioned to radiate lengthwise of said conduit.

3. In an air conditioning system, means for adjusting to a predetermined amount the moisture content of air to be supplied to a conditioned space, a conduit having a metallic-surfaced reflective lining having a high coefficient of reflection for near-visible infra-red radiation, a source of infra-red radiation positioned to radiate into said conduit, and means for passing air from said moisture content adjusting means through said conduit and into a space to be conditioned.

4. In an air conditioning system, means for adjusting to a predetermined amount the moisture content of air to be supplied to a conditioned space, an elongated conduit having a metallic-surfaced reflective lining having a high coefficient of reflection for near-visible infra-red radiation, a source of infra-red radiation positioned to radiate lengthwise of said conduit, and means for passing air from said moisture content adjusting means through said conduit and into a space to be conditioned.

HAROLD T. STOWELL.